May 17, 1949. E. B. ALDOUS 2,470,676
PNEUMATIC VEHICLE SUSPENSION
Filed May 29, 1944
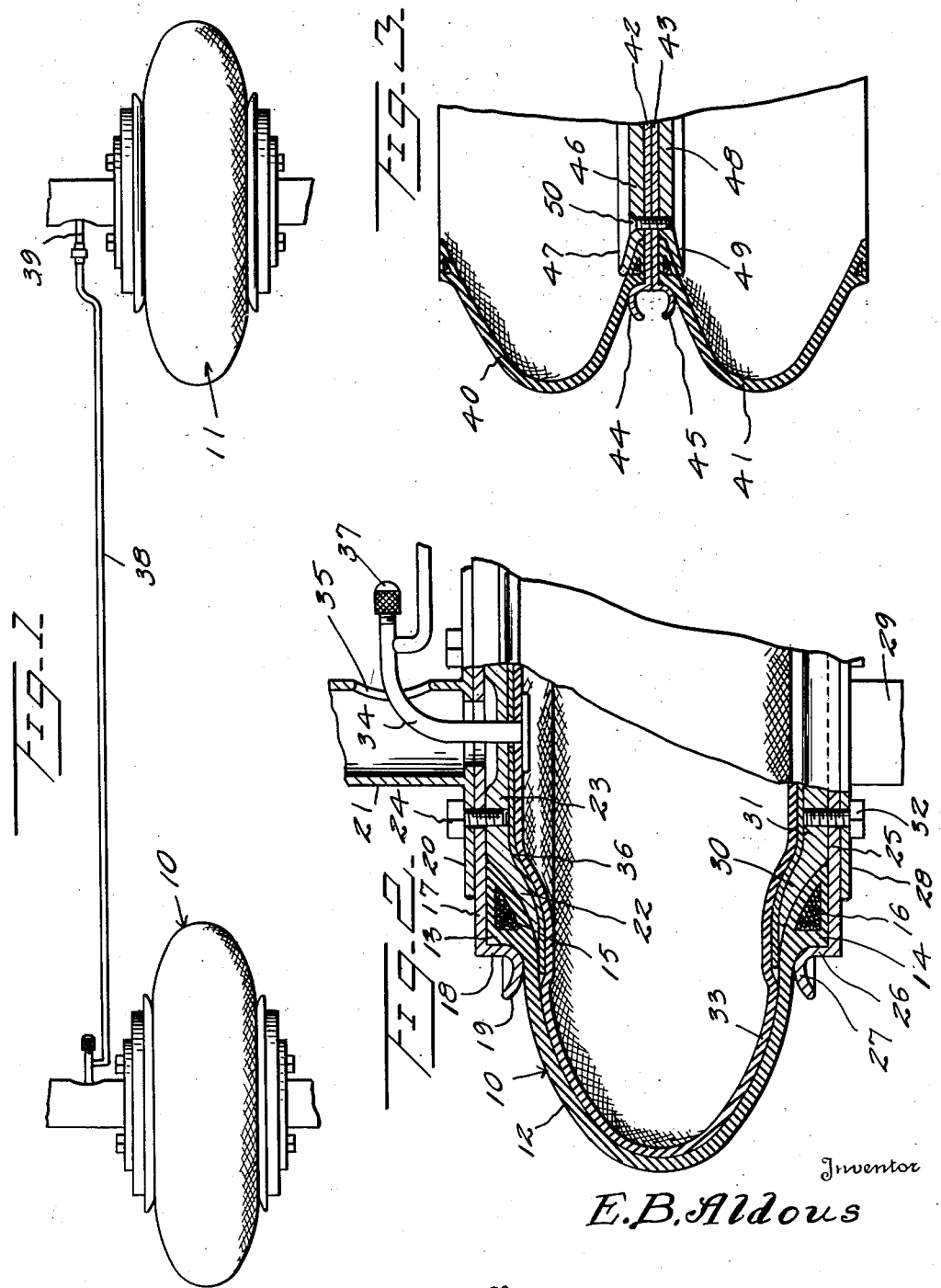
Inventor
E. B. Aldous
By Kimmel & Crowell
Attorneys Patented May 17, 1949

2,470,676

UNITED STATES PATENT OFFICE 2,470,676

PNEUMATIC VEHICLE SUSPENSION

Earl B. Aldous, Gansevoort, N. Y.

Application May 29, 1944, Serial No. 537,792

2 Claims. (Cl. 267—65)

1

This invention relates to a pneumatic vehicle suspension means.

An object of this invention is to provide a pneumatic suspension means for a vehicle which can be connected between the body or frame of the vehicle and the axles, thereby eliminating the usual springs.

Another object of this invention is to provide a suspension means of this kind which will permit adjustment of the cushioning effect by merely increasing or decreasing the fluid pressure in the cushioning element.

A further object of this invention is to provide a suspension means of this kind which embodies the use of inner and outer rubber casings and an improved means for securing the casings to the vehicle.

A further object of this invention is to provide a suspension means of this kind wherein the pneumatic members may be coupled together in pairs so that a single inflating valve may be used, and the pressures of the members of each pair will be equalized.

With the foregoing objects and others which may hereinafter appear, the invention consists of the novel construction, combination and arrangement of parts as will be more specifically referred to and illustrated in the accompanying drawing wherein is shown an embodiment of the invention, but it is to be understood that changes, variations and modifications may be resorted to which fall within the scope of the invention as claimed.

In the drawings:

Figure 1 is a detail rear elevation of a pair of vehicle suspension devices constructed according to an embodiment of this invention, Figure 2 is a fragmentary enlarged vertical section partly in detail of one of the suspension devices, and Figure 3 is a fragmentary vertical section of a modified form of suspension device.

Referring to the drawing, the numerals 10 and 11 designate a pair of pneumatic suspension devices which are adapted to be connected between an axle and the frame or chassis of a vehicle. The suspension devices 10 and 11 are of like construction and the detailed description of one of these devices will apply equally as well to the other device.

The suspension device 10 includes an outer flexible or rubber casing 12 which is formed with a pair of inner annular beads 13 and 14. The bead 13 is reinforced by reinforcing wires 15 and the bead 14 is reinforced by embedded wires 16.

2

An upper mounting plate 17 of circular configuration engages the upper bead 13 and is provided with an outer marginal flange 18 terminating at its lower end in an annular dished flange 19. The plate 17 has secured to the upper side thereof a circular plate 20 which is provided centrally thereof with a tubular member 21. The tubular member 21 is adapted to be secured in any suitable manner to the lower side of the frame or chassis of the vehicle.

A clamping plate 22 engages the inner side of the bead 13 being of downwardly flared configuration and having formed integral therewith a flat plate 23 which is secured by fastening members 24 to the plate 20. The fastening members 24 engage through the plate 17 so as to firmly secure the upper bead 13 to the supporting or attaching member 21.

A lower circular plate 25 engages the lower side of the bead 14 and has formed with the outer margin thereof a flange 26 terminating in a concavo-convex flange 27. An attaching plate 28 engages the lower side of the plate 25 and has formed integral therewith a depending attaching element 29. The attaching element 29 is adapted to be clamped or otherwise firmly secured to the axle or axle housing of the vehicle. An inner clamping plate 30 of flared construction is formed integral with an annular plate 31 and bears against the inner side of the bead 14. The plate 31 is secured to the plate 28 by fastening members 32 and tightening of the fastening members 32 will also tightly hold the plate 25 to the lower assembly.

An inner tube 33 is disposed within the casing 10 and has secured thereto a valve stem 34. The valve stem 34 extends upwardly into the tubular mounting member 21 and the latter is formed with an opening 35 through which the valve stem 34 is extended so that the inner tube 33 may be filled with air under desired pressure. A reinforcing disc 36 is interposed between the inner tube 33 and the upper plate 23, being positioned about the valve stem 34. The stem 34 is provided with a cap 37 and it will be understood that a conventional check valve or valve insert may be mounted in the outer portion of the stem 34.

In order to provide a means whereby the suspension member 11 may be filled with air at the same time that the suspension member 10 is filled with air, I have provided a connecting pipe or tube 38 which connects valve stem 34 with a valve stem 39 connected to the inner tube of suspension member 11.

Referring now to Figure 3, there is disclosed a modified form of this invention wherein a pair of pneumatic casings 40 and 41 are disposed in superposed relation and are connected together at their confronting sides. It will be understood that the casings 40 and 41 will have mounted therein inner tubes similar to inner tube 33 so as to provide the desired pressure within the casings 40 and 41.

A pair of plates 42 and 43 are disposed between the two casings 40 and 41 and are provided at their outer margins with beads 44 and 45. A clamping plate 46 having a flared outer margin 47 is disposed on the upper side of plate 42 and a clamping plate 48 is disposed on the lower side of plate 43 and is formed with a flared margin 49. The plates 42, 43, 46 and 48 are firmly secured together by means of fastening members 50.

In the use of this pneumatic suspension means, the suspension members are interposed between the axle or axle housing and the frame or chassis of the vehicle being secured thereto by the attaching members 21 and 29. The casings 10 and 11 are placed under the desired pressure by connecting valve stem 34 with a suitable air pressure supply. As air under pressure is discharged into valve stem 34, the air will also be discharged into casing 11.

The pneumatic casings 10 and 11 will flex in the usual manner under pressures exerted thereon as the vehicle moves over the road and as the rubber casings 10 and 11 are not subject to wear on their outer portions, these casings may be made quite thin, the thickness of the casings being determined by the weight of the vehicle body supported thereby. This suspension means will eliminate the usual springs and will provide a flexible mounting between the axle and axle housing of the vehicle which will readily flex under operating conditions of the vehicle.

What I claim is:

1. A vehicle suspension comprising an inflated circular member including an outer casing, an inner casing, upper and lower attaching means for securing said outer casing to said vehicle, said attaching means including a tubular central support, an annular flange on the end of said support, an outer clamping plate abutting the flange of said support, an annular bead on the peripheral edges of said outer casing, an inner clamping plate adjacent said outer clamping plate, peripheral flanges on said clamping plates for clamping the bead of said outer casing therebetween, means securing said clamping plates to the flange of said support, and a reinforcing disc between said inner casing and said inner clamping plate.

2. A vehicle suspension as set forth in claim 1, wherein said flange of said outer clamping plate is reverted and dished to provide a smooth clamping surface.

EARL B. ALDOUS.

REFERENCES CITED

The following references are of record in the file of this patent:

UNITED STATES PATENTS

| Number | Name | Date |
|---|---|---|
| 1,111,739 | Davis | Sept. 29, 1914 |
| 1,459,892 | Hughes | June 26, 1923 |
| 1,479,282 | Burns | Jan. 1, 1924 |
| 1,797,146 | Hull | Mar. 17, 1931 |
| 1,865,740 | Bonelli | July 5, 1932 |
| 1,915,304 | Forsyth | June 27, 1933 |
| 2,147,990 | Richter | Feb. 21, 1939 |
| 2,257,913 | Maranville | Oct. 7, 1941 |
| 2,317,057 | Higby | Apr. 20, 1943 |

FOREIGN PATENTS

| Number | Country | Date |
|---|---|---|
| 155,565 | Great Britain | Oct. 1, 1920 |
| 401,632 | France | Aug. 2, 1909 |
| 743,192 | France | Jan. 6, 1933 |